United States Patent [19]
Corbin et al.

[11] Patent Number: 6,145,369
[45] Date of Patent: Nov. 14, 2000

[54] GAUGE ASSEMBLY

[76] Inventors: Bradley Jerome Corbin, 30157 Dover, Flat Rock, Mich. 48134; Gregory Douglas Bober, 22421 Edmunton, St. Clair Shores, Mich. 48080; Gregory Blaise Dahlin, 31051 Roycroft, Livonia, Mich. 48154; John Edward Schnoes, 30650 Minton, Livonia, Mich. 48150; Robert William Hinzmann, 3100 Rolling Green Ct., Milford, Mich. 48380; Stephen Lee Betts, 45779 Gainsborough, Canton, Mich. 48187; Terry Thomas Cwik, P.O. Box 75352, Salem, Mich. 48175

[21] Appl. No.: 09/339,481

[22] Filed: Jun. 24, 1999

[51] Int. Cl.[7] .................................................. G01D 7/00
[52] U.S. Cl. ............................................................. 73/1.88
[58] Field of Search ............................ 73/1.01, 1.88, 73/1.37, 1.59, 1.34; 116/291, 292; 702/86–88

[56] References Cited

U.S. PATENT DOCUMENTS

5,325,314  6/1994  Lippmann et al. ....................... 702/86
5,635,622  6/1997  King ......................................... 73/1.01

Primary Examiner—Robert Raevis
Attorney, Agent, or Firm—Ford Global Technologies, Inc.

[57] ABSTRACT

A gauge assembly 10 having improved accuracy due to its correction of certain errors. The assembly 10 includes a controller 12 which is communicatively coupled to at least one sensor 14 and a gauge driver 16 by use of a communications path or bus 28. Gauge driver 16 selectively and rotatably moves a staff 18 and pointer 26 within a gauge display 22 in response to the certain error compensated data received from controller 12.

8 Claims, 5 Drawing Sheets

GAUGE ASSEMBLY

FIELD OF THE INVENTION

This invention relates to a gauge assembly and more particularly to a micro-controller gauge assembly having improved accuracy due to its correction of pointer, component, and/or assembly related errors.

BACKGROUND OF THE INVENTION

Gauges are used in vehicles and in other assemblies to selectively provide and to display certain information to the operator and/or user of the vehicle or assembly. For example and without limitation, gauges are used to provide the driver and/or passenger of a vehicle with information such as the speed of the vehicle (e.g., a speedometer); the speed of the vehicle's engine (e.g., a tachometer); the amount of gas or other fuel remaining in the vehicle (e.g., a "fuel gauge"); the oil pressure within the vehicle's engine (e.g., an "oil gauge"); the voltage output of the vehicle's battery (e.g., a "battery gauge"); and the temperature of the vehicle's engine (e.g., a "temperature gauge"). Typically, this information is provided by the use of respective and selectively movable pointers. It is desirable to have the information provided by these gauges to be relatively accurate.

Typically, many of these gauges include a microprocessor and/or micro-controller which receives data (e.g., resistance or signal frequency data), from one or more vehicle sensors or modules, representing some or all of the foregoing information (e.g., vehicle and engine speed, fuel contained within the vehicle, or existing oil pressure). The micro-controller utilizes this received information to calculate a desired and correct position for the respective gauge "needle" or pointer and selectively transmits data representing this position to the gauge driver which selectively moves the respective gauge pointer to the desired and correct position. Typically, the micro-controller transmits a plurality of discrete signal pulses or "counts" which cause the gauge driver to move the pointer to a position or angle which is based on and/or is uniquely associated with the number of "counts" which are received.

Each of these prior gauges generally and further includes a "pointer stop" or "post", upon which the gauge pointer rests when the gauge is not "energized" (e.g., is not receiving signals from the micro-controller). A "hold at zero" apparatus typically includes a mechanical or magnetic device and is typically used to hold the pointer against the pointer stop when the gauge is not energized. One mechanical "hold at zero" apparatus, which is used by some other types of gauges, is a "tip heavy pointer". Particularly, in this arrangement, a weight is placed upon the "tip" of the end of the pointer, effective to hold the pointer against the pointer stop by the use of gravitational forces acting upon the weighted tip. One type of magnetic device which is used by still other types of gauges is a "hold at zero" (or "HAZ") magnet, which is a small magnet which is effective to hold the pointer against the pointer stop through magnetic force or attraction.

These prior gauges suffer from several drawbacks which reduce their respective accuracy. For example and without limitation, these gauges typically suffer from a pointer placement offset error. Particularly, pointer placement offset errors arise when the unenergized or "electrical zero" position of the pointer of the gauge is not selectively positioned or "set" to the position on the gauge display corresponding to and/or representing the "zero value" of the display or the "mechanical zero" position (e.g., typically the "mechanical zero" position on a tachometer gauge corresponds to 0 revolutions per minute while the "mechanical zero position" on a speedometer gauge corresponds to 0 miles per hour). The pointer placement offset error is then equal to the number of "counts" or signals that must be received by the gauge driver to move the pointer from the "electrical zero" position to the "mechanical zero" position (or the corresponding number of degrees which the pointer must move in order to be selectively positioned upon the "mechanical zero" or "zero value" display position).

Furthermore, these prior gauges typically suffer from errors caused by their respectively employed "hold at zero" apparatus. These "hold at zero" errors are typically equal to the number of driver "counts" or signals required to offset or "cancel out" the gravitational effects of the tip heavy pointer or the magnetic effects of the HAZ magnet upon the rotor magnet of the gauge driver. These "hold at zero" errors typically vary depending upon the angular position of the pointer (for gauges using a tip heavy pointer) or for the position of the HAZ magnet in relation to the rotor magnet (for gauges using a HAZ magnet).

If not corrected or compensated, these errors will cooperatively and cumulatively cause the gauge to display significantly inaccurate information which could cause a variety of problems or difficulties for the vehicle's driver and other occupants. For example and without limitation, an inaccurate fuel gauge could cause a driver to undesirably "run out of gas"; an inaccurate tachometer could cause a driver to shift the vehicle at improper moments resulting in unnecessary wear to the vehicle's engine; an inaccurate temperature gauge could cause a driver to unknowingly "overheat" the vehicle's engine; and an inaccurate speedometer could cause a driver to unknowingly violate a "speed limit".

There is therefore a need for a new and improved gauge assembly which provides a relatively accurate and selective display of desired information, which corrects pointer placement offset errors and "hold-at-zero" errors, and which provides these benefits in a relatively cost effective manner.

SUMMARY OF THE INVENTION

It is a first object of the invention to provide a gauge assembly which overcomes some or all of the previously delineated drawbacks associated with prior gauge assemblies.

It is a second object of the invention to provide a gauge assembly having an improved accuracy over prior gauge assemblies.

It is a third object of the invention to provide a gauge assembly which can be used in combination with a "hold at zero" magnet or a "tip heavy pointer" and which allows for the selective display of relatively accurate information.

It is a fourth object of the invention to provide a gauge assembly which efficiently corrects pointer placement offset errors and "hold at zero" errors.

According to a first aspect of the present invention a gauge assembly for use with a vehicle having a certain measurable attribute is provided. The gauge assembly includes a sensor which selectively measures the attribute and which produces a certain value based upon the measurement. The gauge assembly further includes a selectively movable pointer and a driver which is coupled to the selectively movable pointer and which selectively moves the pointer. A controller is provided and receives the certain value from the sensor and produces a certain number of signals to the driver effective to cause the driver to move the pointer. The certain number is determined by use of the certain value and by use of a certain error value.

According to a second aspect of the present invention a method of providing an accurate gauge assembly which is used in combination with a vehicle having a certain measurable attribute is provided. The method includes the steps of providing a sensor which selectively measures the certain measurable attribute and which produces a certain value based upon that measurement; providing a selectively movable pointer; providing a display which movably supports the pointer and which includes a certain position which is uniquely associated with the certain value; providing a driver which selectively moves the pointer upon the display; calculating a certain error value which is based upon the certain value; using the certain value and the certain error value to determine a certain number of signals; and communicating the certain number of signals to the driver, effective to cause the pointer to occupy the certain position, thereby providing an accurate indication of the measured attribute.

These and other features, advantages, and objects of the invention will become apparent by reference to the following specification and by reference to the following drawings.

DETAILED DESCRIPTION OF THE PREFERRED EMBODIMENT OF THE INVENTION

Figure 1:
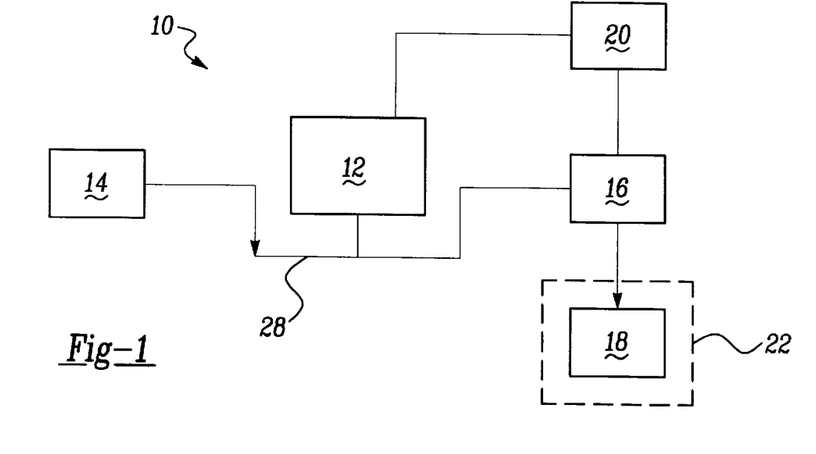
FIG. 1 is a block diagram of a gauge assembly made in accordance with the teachings of the preferred embodiment of the invention.
Figure 2:
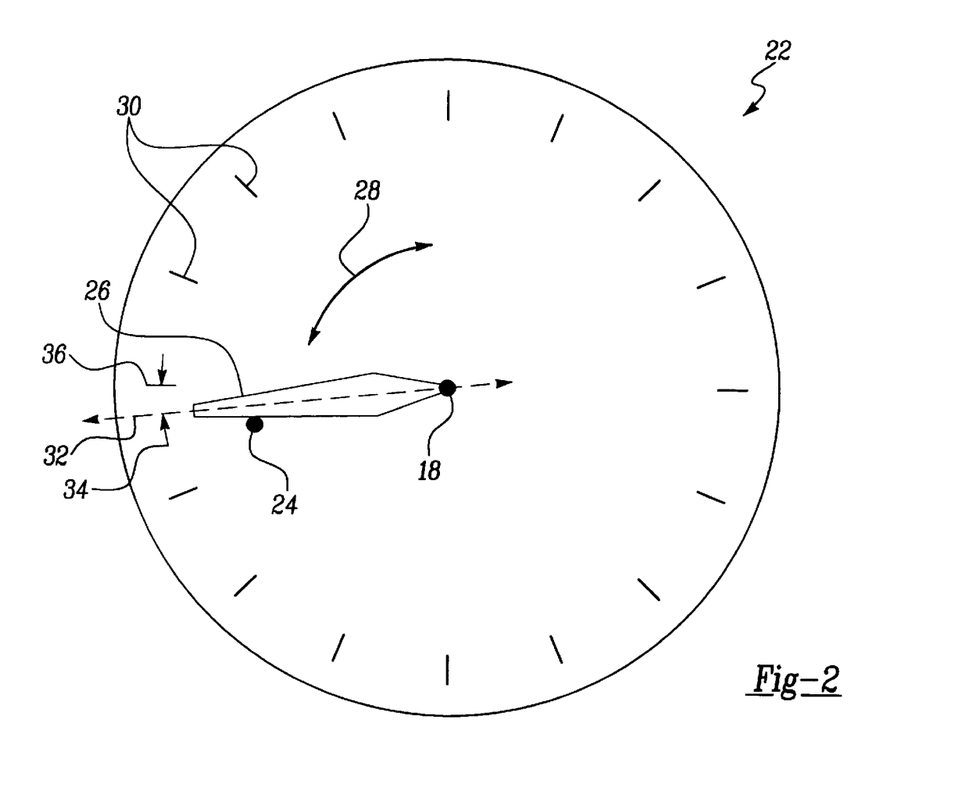
FIG. 2 is a front view of one type of gauge display which may be used within the gauge assembly shown in FIG. 1.

Referring now to FIGS. 1 and 2, there is shown a gauge assembly 10 which is made in accordance with the teachings of the preferred embodiment of the invention. As shown, gauge assembly 10 includes a conventional microprocessor, micro-controller or controller 12 operating under stored program control. Controller 12 is electrically, physically, and communicatively coupled to a gauge driver 16 and to at least one sensor 14 by use of a communications bus or path 28. Gauge driver 16 is a conventional and commercially available gauge driver including an integrated circuit for receiving and analyzing data received from controller 12. Driver 16 further includes a conventional coil-driven rotor magnet (not shown) which selectively moves or rotates a rotor shaft 18 and pointer 26 within and/or upon a gauge display 22 in response to the data received from controller 12. Sensor 14 comprises one or more conventional and commercially available sensors, which measure certain vehicle information or vehicle attributes/characteristics (e.g., vehicle speed, engine speed, engine temperature, and amount of contained fuel), and which cooperatively and selectively provide the measured attribute data to the controller 12. The provided data represents the value of the measured vehicle attribute/characteristic information.

Controller 12 and gauge driver 16 are physically and electrically coupled to a supply voltage 20, which selectively provides electrical power to assembly 10. It should be appreciated that a vehicle may include a plurality of substantially identical "sets" or "collections" of components, each of which cooperatively form a separate and unified gauge assembly. Particularly, each "set" or "collection" includes at least one operatively connected and communicatively coupled sensor 14, gauge driver 16, shaft 18, pointer 26 and display 22. Each "set" is further typically adapted to cooperatively measure and selectively display information associated with at least one vehicle attribute/characteristic.

As best illustrated in FIG. 2, gauge pointer 26 is physically attached or coupled to a selectively movable/rotatable shaft 18. Shaft 18 is physically, electrically, selectively, and rotatably connected to and driven by gauge driver 16 in a conventional manner. Gauge display 22 further includes a plurality of distributably positioned markings or chaplets 30, each of which represent values or estimations of a certain vehicle attribute, such as and without limitation estimations or values of engine or vehicle speed. As shaft 18 is selectively rotated in the direction of arrow 28, pointer 26 travels upon the display 22 and on or between one or more chaplets 30, thereby selectively indicating and/or displaying an estimation of the value of a certain vehicle attribute or characteristic which has been measured by one or more of the sensors 14.

When driver 16 is "at rest" or unenergized (i.e., driver 16 is not receiving any data from controller 12), pointer 26 rests upon pointer stop 24. Particularly, when "at rest", the longitudinal axis 32 of pointer 26 rests below the one chaplet 36 representing a value of zero (i.e., the "mechanical zero" of the display 22) and forms angle 34 with the chaplet 36. The value of angle 34 represents the "pointer placement offset error" of display 22.

Pointer 26 is made to rest upon stop 24, by way of a conventional "hold at zero" feature or device, comprising, for example, a suitable amount of weight which is added to the tip of pointer 26 (not shown) (i.e., making pointer 26 a "tip heavy pointer"), or by use of a conventional "hold at zero" ("HAZ") magnet (not shown). The "error" caused by the "hold at zero" feature or device is sinusoidal in nature and varies with respect to the position of the pointer 26.

Figure 3:
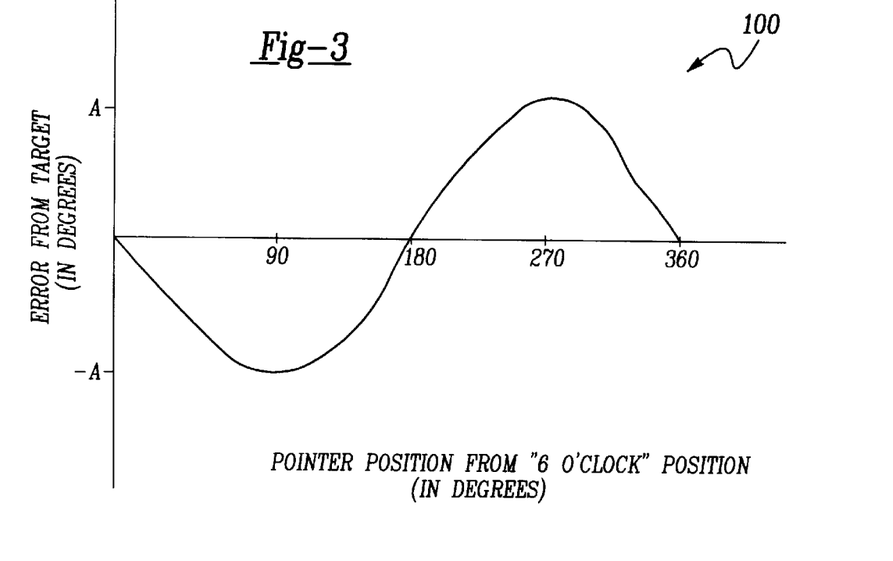
FIG. 3 is a graph of the error characteristics associated with a gauge assembly having a tip heavy pointer.

Referring now to FIG. 3, there is shown a graph 100 of the error resulting from a conventional or typical tip heavy pointer. As shown, in one embodiment, the error is graphically expressed in terms of pointer angular displacement from a reference point substantially equaling the "6 o'clock" position upon the display 22. The error ranges from a positive peak amplitude denoted as "A" when the pointer is at the "3 o'clock" position (i.e., 270 degrees from the "6 o'clock" reference position), to a negative peak amplitude—"A" when the pointer is at the "9 o'clock position" (i.e., 90 degrees from the "6 o'clock" reference position). The error reaches a minimum amplitude or is substantially equal to zero when the pointer 26 is in the "6 o'clock" position and in the "12 o'clock" position (i.e., 180 degrees from the "6 o'clock" reference position). Particularly, the error can be represented by the following equation: $E_{THP}=A \cdot \sin(\text{phi}+\text{theta})$ where "$E_{THP}$" is the error attributable to the tip heavy pointer, "A" is the error amplitude, "phi" is the angle of the pointer relative to the "6 o'clock" reference position, and theta is the phase of the sinusoidal error characteristic curve (e.g., 0 degrees in the non-limiting example shown in FIG. 3).

Figure 4:
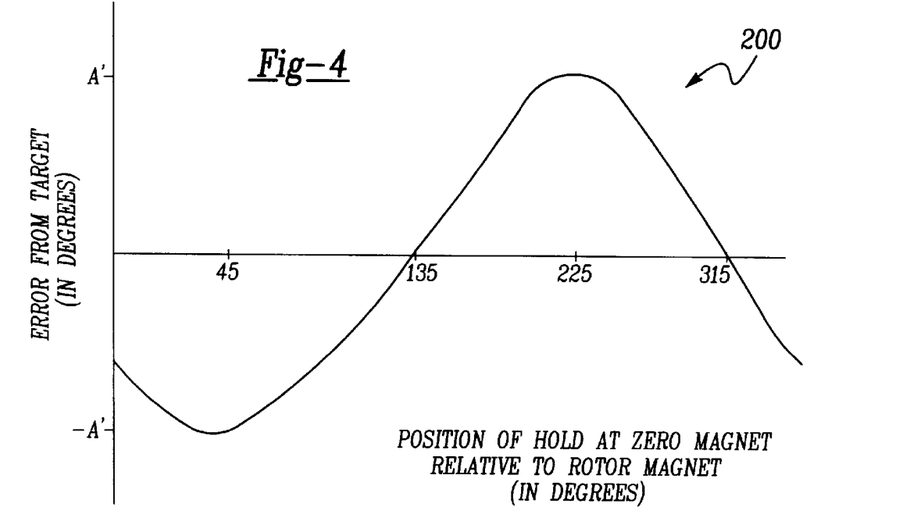
FIG. 4 is a graph of the error characteristics associated with a gauge assembly having a HAZ magnet.

Referring now to FIG. 4, there is shown a graph 200 representing the error resulting from a conventional or typical hold at zero magnet. As shown, the error ranges from a positive peak amplitude denoted as "A'" when the conventional hold at zero magnet is at a position about 225 degrees relative to the gauge driver's rotor magnet (not shown) to a negative peak amplitude denoted as "−A'" when the hold at zero magnet is at a position about 45 degrees relative to the gauge driver's rotor magnet. The error reaches a minimum amplitude or is substantially equal to zero when the hold at zero magnet is at a position approximately 135 degrees and/or 315 degrees from the gauge driver's rotor magnet. The error can be represented by the following equation: $E_{HAZ}=A'\cdot\sin(\text{phi}'+\text{theta}')$ where $E_{HAZ}$ is the error attributable to the hold at zero magnet, "A'" is the error amplitude, "phi'" is the angle of the hold at zero magnet relative to the gauge driver's rotor magnet, and "theta'" is the phase of the sinusoidal characteristic curve (e.g., 45 degrees in the non-limiting example shown in FIG. 4).

The total "pre-compensated" error present in the gauge assembly 10 substantially equals the pointer placement offset error ("PPO") and the error cause by the hold at zero feature or device (i.e., either "$E_{TPH}$" or "$E_{HAZ}$" depending on which feature or device is actually used). This cumulative or cooperative error must be selectively corrected in order to provide a gauge assembly 10 having an improved accuracy.

In operation, controller 12 receives signals from one or more of the sensors 14 respectively representing information for a certain vehicle attribute, and translates and/or processes these signals by way of a conventional program or algorithm into "desired" or target or pointer position commands which selectively cause pointer 26 to move in a desired manner. Controller 12 communicatively sends the command data to the gauge driver 16 by selective use of one or more discreet signals or "driver counts".

By way of example and without limitation, for purposes of this description, "zero" or an absence of command signals or "driver counts" represents the "electrical zero" of the gauge assembly illustrated in FIG. 2 (i.e., the controller 12 has not commanded pointer 26 to move from the displayed zero position), and a series of 1024 "counts" or signals represents about 360 degrees of commanded pointer rotation or movement from the electrical zero position. Gauge driver 16 typically determines the number of "counts" or signals received within a certain predetermined period of time and, in response to the determined number of "counts" or signals received during this predetermined period of time, places a certain voltage upon the one or more conventional coils which control the rotor magnet, thereby rotating the magnet and the shaft 18 to the corresponding or representative display position.

In this numerical example, 512 "counts" received in a particular interval of time should "ideally" (i.e., if not for the pointer placement offset error and hold at zero feature error) cause driver 16 to move shaft 18 and pointer 26 to the 180 degrees or "3 o'clock position" and 256 "counts" received, during this time interval, should "ideally" cause driver 16 to move shaft 18 and pointer 26 to the 90 degrees or the "12 o'clock" position. Because of errors related to pointer placement offset and the hold at zero feature, controller 12, according to the teachings of the preferred embodiment of the invention and in order to improve the overall accuracy of assembly 10, adjusts the "ideal" number of "counts" to compensate for these errors and to provide for an accurate display of vehicle information in the manner described below.

In order to describe the error compensation performed by assembly 10, an example of a "speedometer" gauge will be used. It should be realized that the invention will perform in a substantially identical manner with substantially identical results and benefits for other vehicle attribute sensors and gauge combinations and that the invention is not limited to a speedometer assembly.

In order to adjust for hold at zero and pointer placement offset errors, assembly 10 must first be calibrated. The total error present at any pointer position upon display 22 is defined by the following equation:

Total Error=$PPO+A\cdot\sin(\text{phi}+\text{theta})$ (if a tip heavy pointer is used) (Eq. 1)

or

Total Error=$PPO+A'\cdot\sin(\text{phi}'+\text{theta}')$ (if a hold at zero magnet is used) (Eq. 2)

In either case, the equation provides two "unknowns", i.e., "PPO", which is the pointer placement offset error and "A" or "A'" which is the peak amplitude of the hold at zero feature error. Visual system measurements are used to provide the total error or deviation from ideal pointer positions at two calibration points. In the preferred although non-limiting embodiment of the invention, the pointer is nominally, mechanically and initially offset at approximately −11 degrees below the chaplet 36 corresponding to a zero value, in order to compensate for gauge and equipment tolerances and to ensure that the pointer placement offset correction is positive (e.g., the pointer resides at a position about 11 degrees below chaplet 36 when no "counts" are received).

Figure 5:
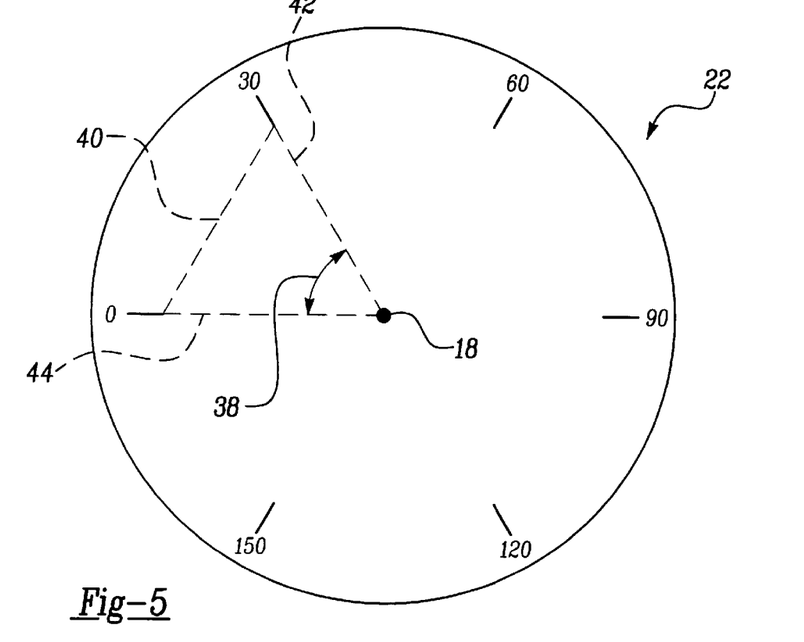
FIG. 5 is a front view of the display shown in FIG. 2, illustrating the creation of a calibration target angle.

Two calibration points or speeds are initially chosen and the number of driver counts required for the pointer 26 to ideally reach each of these initially chosen calibration points are separately calculated in the manner described below. First, the angle between a line segment connecting the target calibration chaplet with shaft 18 and a second line segment connecting shaft 18 to chaplet 36 is calculated. As illustrated in FIG. 5, a visual determination is made, in a conventional manner, such as by measuring an angle 38 defined by a first line segment 42 connecting shaft 18 to the chaplet indicating the target calibration speed (e.g., 30 MPH) and a second line segment 44 connecting the shaft 18 to the mechanical zero chaplet (i.e., 0 MPH). The value of angle 38 is increased by the pointer placement offset value of 11 degrees to yield the "ideal amount or number of electrical degrees from zero" at which the calibration point resides. Similarly, a second angular value is determined for a second calibration chaplet 30 or point.

Angle 38 can also be estimated using the "law of cosines" (e.g., $c^2=a^2+b^2-(2ab)\cdot\text{Cos C}$, or C=Arc $\text{Cos}((a^2+b-c^2)/(2ab))$. The angle 38 can be determined by substituting the following values into either equation: a=the length of line 42, b=the length of line 44, c=the length of line 40, and C equals the value of angle 38.

Alternatively, the angle can be determined by the following equation:

"ideal electrical degrees from zero"=(target mechanical angle)+ (nominal pointer placement offset error) (Eq. 3), where the target mechanical angle equals the target calibration speed multiplied by the total "sweep" in degrees of the speedometer (i.e., 360° in this example) divided by the total range of the speedometer in "miles per hour" (i.e., 180 MPH in this example). For the example of a 30 MPH calibration point, "the ideal electrical angle" or "degrees from zero" equals 71 degrees (i.e., 71°=30 MPH·360°/180 MPH+11°). For a 60 MPH calibration point, the ideal electrical angle would equal 131 degrees (i.e., 131°=60 MPH·360°/180).

The calculated "ideal electrical angle" for each of the two target calibration points is converted to an "ideal" number of driver "counts" or signals required for driver 16 to ideally drive pointer 26 to the respective calibration chaplets 30. This is done by way of the following equation:

ideal driver counts for a target point=Round [ideal electrical anglex(1024 driver counts/360 degrees)];     (Eq. 4)

where "Round" denotes a conventional mathematical "rounding" function.

In the foregoing example, the ideal driver "counts" or number of signals required for driver 16 to move shaft 18 to the target position corresponding to 30 MPH is equal to 202 (i.e., 202=Round [71 degrees·(1024 driver counts/360 degrees)]). For a second calibration point of 60 MPH, the ideal driver "counts" or "signal number" is equal to 373 (i.e., 373=Round [131 degrees·(1024 driver counts/360 degrees)].

The "ideal driver counts" are then sent, by the controller 12 to driver 16, in order to determine the error at each calibration point. Particularly, to determine the error at each point, the position of pointer 26 is visually measured such as by way of a conventional vision-based measurement system. For example and without limitation, the "law of cosines" is used in the following manner to determine the actual display error at each calibration point.

Figure 6:
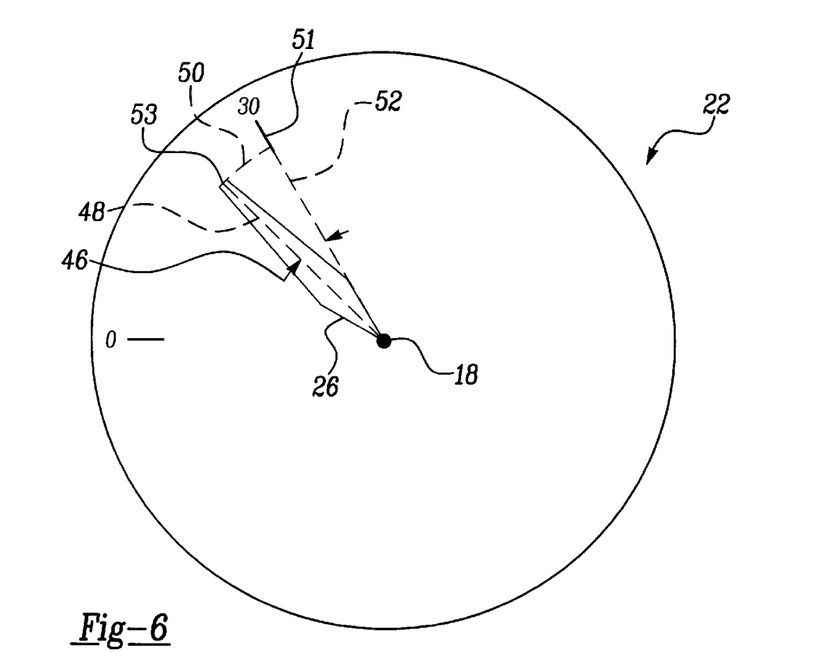
FIG. 6 is a front view of the display shown in FIG. 2, illustrating the creation of a calibration error angle.

Referring to FIG. 6, there is shown gauge display 22 having a pointer 26 which is selectively moved or "driven" by driver 16. Particularly, after the driver 16 receives 202 "counts" or signals, the pointer 26 is moved to a position 53 which should ideally correspond to the "30 MPH" calibration point. The amount of error is shown as angle 46, representing the angular offset between the chaplet 51 actually corresponding to 30 MPH and the actual pointer position 53. Line 48 lies along the longitudinal axis of pointer 26 from staff 18 to the center of the tip of pointer 26. Line 50 connects line 48 from the center of the tip of pointer 26 to the center of the calibration target chaplet (e.g., 30 MPH) and line 52 connects the center of the target chaplet to the staff 18. The amount of error (i.e., angle 46) can be determined by substituting the following values into either of the above-identified law of cosines equations: a=the length of line 48, b=the length of line 52, c=the length of line 50, and C equals the value of angle 46. The amount of error for the second calibration point (e.g., 60 MPH) can be calculated in a substantially identical manner.

The error can be represented by the following equation:

$Error_n = PPO + A * \sin(phi_n + theta)$     (Eq. 5);

where "$Error_n$" is the error at calibration point n, "PPO" is the pointer offset error, "$phi_n$" is the ideal driver count for calibration point n converted back to degrees by multiplying by (360/1024), "A" is the amplitude of the sinusoidal component of the error, and "theta" is the phase of the sinusoidal error characteristic (e.g., 0 degrees for gauges employing a tip heavy pointer or 45 degrees for gauges employing a HAZ magnet). Determining a value for "$Error_n$" at 2 calibration points, provides 2 equations with 2 unknowns (e.g., pointer offset error and amplitude). Pointer offset error and amplitude are solved by substitution. For example and without limitation the following equations may be used:

$Error_1 = PPO + A * \sin(phi_1 + theta)$     (Eq. 6)

$Error_2 = PPO + A * \sin(phi_2 + theta)$     (Eq. 7)

"A" is "solved for" in terms of "$Error_1$" and is substituted into the $Error_2$ equation to yield:

$Error_2 = PPO + [(Error_1 - PPO)/(\sin(phi_1 + theta))] * \sin(phi_2 + theta)$     (Eq. 8)

Expanding Eq. 8 and simplifying in terms of "PPO" provides:

$Error_2 * (\sin(phi_1 + theta)) = PPO * [(\sin(phi_1 + theta)) - (\sin(phi_2 + theta))] + Error_1 * (\sin(phi_2 + theta));$     (Eq. 9)

and solving for "PPO" gives:

$$PPO = \frac{[Error_2] * (\sin(phi_1 + theta)) - Error_1 * (\sin(phi_2 + theta))]}{[(\sin(phi_1 theta)) - (\sin(phi_2 + theta))]}$$     (Eq. 10)

The "PPO" expression is then substituted back into the "$Error_1$" equation, yielding:

$$Error_1 = \frac{[Error_2 * (\sin(phi_1 + theta)) - Error_1 * (\sin(phi_2 + theta))]}{[(\sin(phi_1 + theta)) - (\sin(phi_2 + theta))]} + A * \sin(phi_1 + theta),$$     (Eq. 11)

which can be expanded and solved for "A" in the following manner:

$$A * \sin(phi_1 + theta) =$$     (Eq. 12)
$$Error_1 \frac{[Error_2 * (\sin(phi_1 + theta)) - Error_1 * (\sin(phi_2 + theta))]}{[(\sin(phi_1 + theta)) - (\sin(phi_2 + theta))]};$$

$$A = \frac{Error_1}{\sin(phi_1 + theta)} - \frac{[Error_2 * (\sin(phi_1 + theta)) - Error_1 * (\sin(phi_2 + theta))]}{[(\sin(phi_1 + theta)) - (\sin(phi_2 + theta))] * \sin(phi_1 + theta)};$$     (Eq. 13)

$$A = \frac{Error_1 * [(\sin(phi_1 + theta)) - (\sin(phi_2 + theta))] - [Error_2 * (\sin(phi_1 + theta)) - Error_1 * (\sin(phi_2 + theta)]}{[(\sin(phi_1 + theta)) - (\sin(phi_2 + theta))] * \sin(phi_1 + theta)}$$     (Eq. 14)

and simplified to:

$$A = \frac{Error_1 * (\sin(phi_1 + theta)) - Error_2 * (\sin(phi_1 + theta))}{[(\sin(phi_1 + theta)) - (\sin(phi_2 + theta))] * \sin(phi_1 = theta)};$$ and     (Eq. 15)

$$A = \frac{Error_1 - Error_2}{(\sin(phi_1 + theta)) - (\sin(phi_2 + theta))}$$     (Eq. 16)

Figure 7:
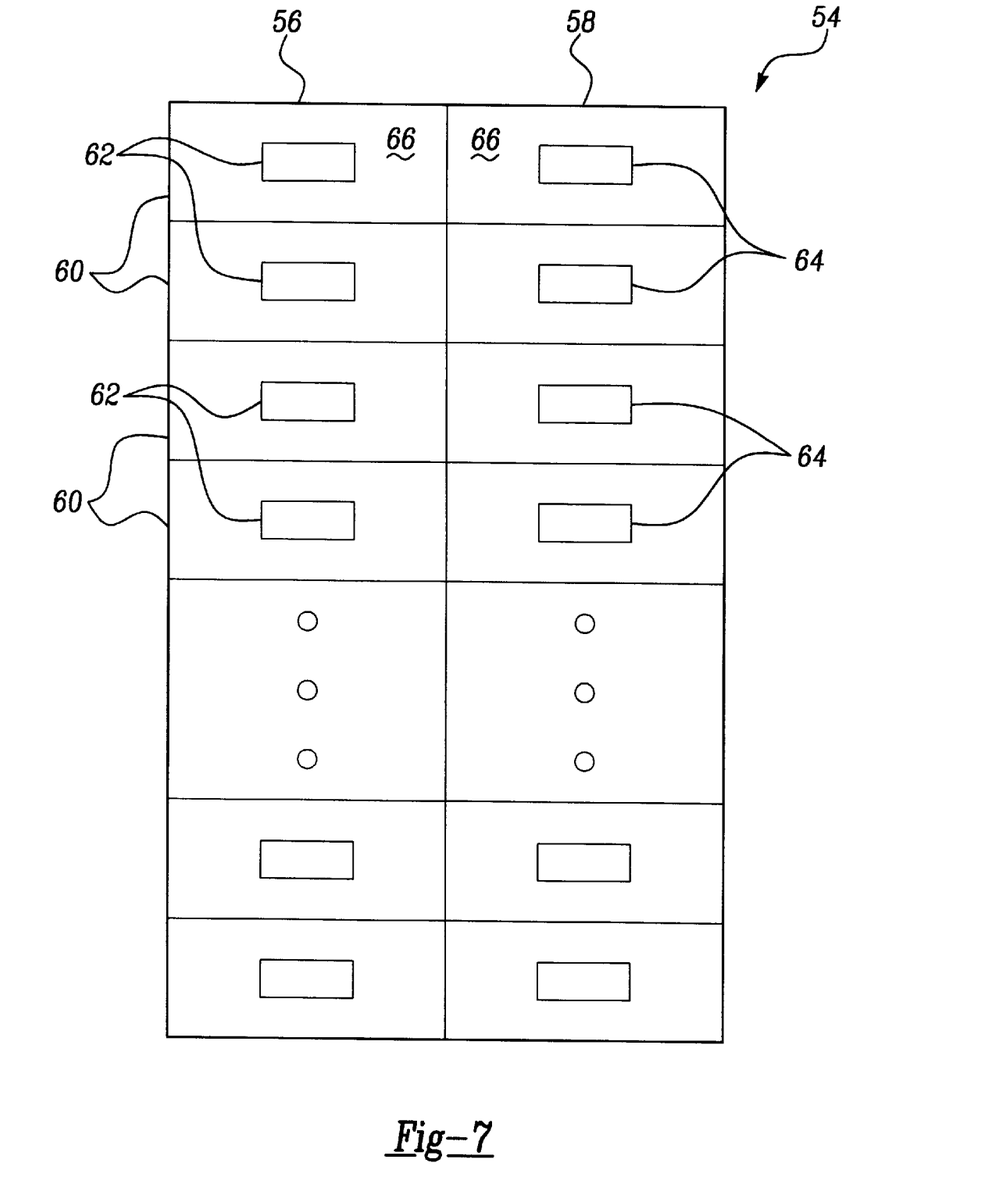
FIG. 7 is a block diagram of a table stored within the non-volatile memory of the micro-controller of the gauge assembly shown in FIG. 1.

Referring now to FIG. 7, once the amplitude of the hold at zero error characteristic and the pointer placement offset error are determined, a table 54, held within the non-volatile memory of controller 12, is generated and selectively contains values of the driver "counts" required to drive pointer 26 to corresponding values or positions upon display 22. In the preferred embodiment of the invention, the table 54 includes two columns 56, 58 and a plurality of rows 60 which cooperate with the columns 56, 58 to form cells 66. Values 62, 64 are stored within the cells 66 of the table. Particularly, values 62, 64 which are resident within the same row 60 are "corresponding" values.

Each value 62 represents a value of a vehicle attribute (e.g., vehicle speed). Each value 64 represents the adjusted or compensated number of driver "counts" associated with its respective corresponding value 62 (i.e., required to cause driver 16 to move pointer 26 to the position upon display 22 which is associated with the corresponding value 64).

Particularly, each value 64 is calculated by adding the number of "ideal" driver "counts" for the respective corresponding target value 62 to the number of "counts" associated with the total error measured or calculated for that respective corresponding target value 62. Particularly, the number of "ideal driver counts" for each respective target value 62 are calculated using Eqs. 3 and 4. The "total error" counts for each respective target value 62 are calculated using Eq. 5. Particularly, when employing the foregoing equation 5, the term or value "$Error_n$" equals the error at the target value 62 in row n, and the term or value "$phi_n$" equals the "ideal driver count" for the target value 62 in row n, mathematically converted into degrees by multiplying the "count value" by (360/1024).

In this non-limiting example, column 56 includes approximately eight cells containing speed values 62, in increasing numerical order from the top row 60 of table 54 to the bottom row 60. The values 62 stored within table 54 are preferably and substantially "spread out" or substantially and evenly spaced between the minimum and maximum values contained within and/or upon display 22. For example and without limitation, column 56 may include the following values: 0 MPH, 20 MPH, the speed indicated by the chaplet 30 which is closest to the "9 o'clock" position, 30 MPH, 60 MPH, 90 MPH, the speed indicated by the chaplet 30 which is closest to the "3 o'clock" position, and the maximum speed. For each value 62, an associated and corresponding driver count 64 is calculated and adjacently stored within table 54.

In one embodiment, table 54 also contains additional rows having other information, such as the minimum speed and the maximum speed illustrated on display 22, the amplitude of the sinusoidal error characteristic of the hold at zero apparatus employed by the gauge, the value of the pointer placement offset error, the total sweep in degrees of the display 22, and the ideal number of counts which must be generated in order to make pointer 26 move or "sweep" through all of the allowed positions degrees.

Figure 8:
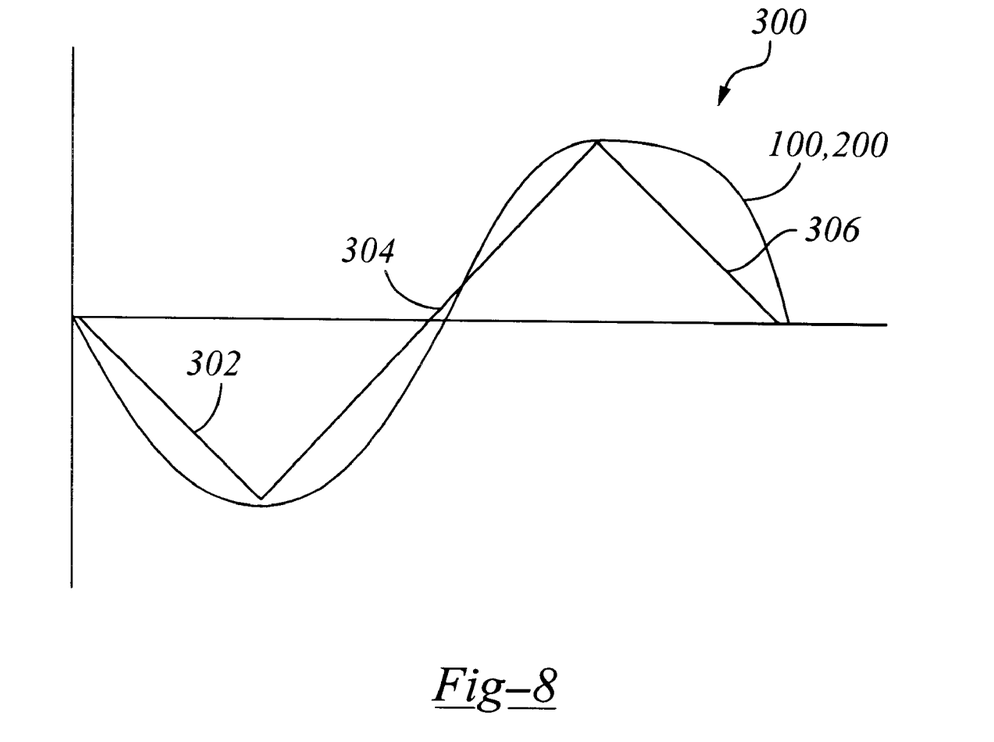
FIG. 8 is an error interpolation graph illustrating an operation of the assembly shown in FIG. 1.

In operation, controller 12 compensates for pointer placement offset error and "hold at zero" error by use of table 54. More particularly, controller 12 receives signals from each of the sensors 14 representing vehicle information and translates these signals by way of a conventional program or algorithm into a "desired" or target value for pointer 26 (e.g., 30 MPH). Controller 12 then accesses table 54 and searches column 56 for the desired target value 62. If the desired target value 62 is located within column 56, the corresponding value 64 in column 58 is selectively accessed and that number of "counts" or signals is sent by controller 12 to the gauge driver 16, thereby causing pointer 26 to selectively and rotatably move to the position upon display 22 which corresponds to the desired target value 62. In this manner, the foregoing positional errors are automatically corrected and the communicated data is automatically "error compensated", thereby causing the pointer 26 to accurately reflect the value of the measured attribute. If the exact or desired target value is not located within column 56, controller 12 locates the two values 62 in column 56 between which the exact target value numerically falls. For each of these two values 62, controller 12 identifies the respective corresponding values 64 located in column 58. Controller 12 then performs a conventional linear interpolation upon the two located values 64 within column 58 to calculate the compensated or adjusted number of driver "counts" required to cause driver 16 to move pointer 26 to the desired target value position within and/or upon display 22. As shown best in graph 300 of FIG. 8, this linear interpolation process allows the error curves 100, 200 to be estimated by several "straight line" segments, such as but not limited to segments 302, 304, 306.

In this manner, the present invention compensates for pointer placement offset errors and errors related to the hold at zero feature, and thus may be used to accurately display vehicle information. It should be understood that the various embodiments described and provided herein are provided by way of example only and that numerous changes, alterations, modifications, and substitutions may be made without departing from the spirit and scope of the invention delineated within the following claims.

What is claimed is:

1. A gauge assembly for use with a vehicle having a certain measurable attribute, said gauge assembly comprising:

a sensor which selectively measures said attribute and which produces a certain value based upon said measurement;

a selectively movable pointer having a hold at zero feature;

a driver which is coupled to said selectively movable pointer and which selectively moves said pointer to a certain angular position; and a controller which receives said certain value from said sensor and which produces a certain number of second signals to said driver effective to cause said driver to move said pointer to said certain angular position, said certain number being determined by use of said certain value and by use of a certain error value which is effective to compensate for said hold at zero feature and which is determined based upon said certain angular position.

2. The gauge assembly of claim 1 further comprising a display which movably supports said pointer.

3. The gauge assembly of claim 1 wherein said pointer assembly includes a rotor magnet and wherein said hold at zero feature comprises a hold at zero magnet assembly which is selectively disposed at a certain angle relative to said rotor magnet and wherein said error value is determined by use of the following equation:

$$E = PPO + A \cdot \sin(phi + theta),$$

where "E" represents said error value; "PPO" represents a pointer placement offset error; "A" represents an error amplitude value; "phi" represents an angle based upon said certain angle; and "theta" represents an error phase angle.

4. The gauge assembly of claim 1 wherein said assembly further includes a weighted pointer tip portion and wherein said error value is determined by use of the following equation:

$$E = PPO + A \cdot \sin(phi + theta),$$

where "E" represents said error value; "PPO" represents a pointer placement offset error; "A" represents an error amplitude value; "phi" represents said certain angular position relative to a reference position; and "theta" represents an error phase angle.

5. A gauge assembly for use with a vehicle having a certain measurable attribute, said gauge assembly comprising:
- a sensor which selectively measures said attribute and which produces a certain value based upon said measurement;
- a display having a certain angular position uniquely associated with said certain value;
- a selectively movable pointer, which is disposed upon said display, and which includes a hold at zero feature;
- a driver which is coupled to said selectively movable pointer and which selectively moves said pointer to said certain angular position upon receipt of a certain number of signals; and
- a controller which is coupled to said driver and to said sensor, which receives said certain value, which determines said certain number by use of said certain value and an error value, said error value being effective to compensate for said hold at zero feature and being calculated based upon a sinusoidal function of said certain angular position, and which generates and communicates said certain number of signals to said driver, effective to cause said driver to move said pointer to said certain angular position.

6. A method of providing an accurate gauge assembly which is used in combination with a vehicle having a certain measurable attribute, said method comprising the steps of:

- providing a sensor which selectively measures said certain measurable attribute and which produces a certain value based upon said measurement;
- providing a selectively movable pointer having a hold at zero feature;
- providing a display which movably supports said pointer and which includes a certain position which is uniquely associated with said certain value;
- providing a driver which selectively moves said pointer upon said display;
- calculating a certain error value which is based upon said certain value and which is effective to compensate for said hold at zero feature;
- using said certain value and said certain error value to determine a certain number of signals; and
- communicating said certain number of signals to said driver, effective to cause said pointer to occupy said certain position, thereby providing an accurate indication of said measurement of said attribute.

7. The method of claim 6 wherein said hold at zero feature comprises a certain weighted portion which is disposed upon said pointer.

8. The method of claim 6 wherein said hold at zero feature comprises a hold at zero magnet assembly.

* * * * *